(12) United States Patent
Iden et al.

(10) Patent No.: US 10,465,419 B2
(45) Date of Patent: Nov. 5, 2019

(54) SELF-LEARNING LOCK AND LOCK ASSEMBLY

(71) Applicant: RB Distribution, Inc., Colmar, PA (US)

(72) Inventors: John W. Iden, Pipersville, PA (US); James J. Rivera, Allentown, PA (US)

(73) Assignee: RB Distribution, Inc., Colmar, PA (US)

( * ) Notice: Subject to any disclaimer, the term of this patent is extended or adjusted under 35 U.S.C. 154(b) by 117 days.

(21) Appl. No.: 15/720,744

(22) Filed: Sep. 29, 2017

(65) Prior Publication Data
US 2019/0100939 A1    Apr. 4, 2019

(51) Int. Cl.
*E05B 29/00* (2006.01)
*E05B 15/14* (2006.01)
*E05B 27/00* (2006.01)
*B60R 25/021* (2013.01)

(52) U.S. Cl.
CPC ............ *E05B 29/004* (2013.01); *E05B 15/14* (2013.01); *B60R 25/02115* (2013.01); *E05B 27/005* (2013.01); *E05B 2015/146* (2013.01)

(58) Field of Classification Search
CPC .. E05B 15/14; E05B 15/143; E05B 2015/146; E05B 29/00; E05B 29/0033; E05B 29/004; E05B 27/005
See application file for complete search history.

(56) References Cited

U.S. PATENT DOCUMENTS

| | | | | |
|---|---|---|---|---|
| 3,290,910 A | * | 12/1966 | Laviana | E05B 29/004 70/372 |
| 3,589,153 A | | 6/1971 | Hill | |
| 4,376,382 A | * | 3/1983 | Raymond | E05B 29/004 70/338 |
| 4,966,021 A | * | 10/1990 | Boag | E05B 29/004 70/377 |
| 6,860,131 B2 | | 3/2005 | Armstrong et al. | |
| 6,973,813 B2 | * | 12/2005 | Erdely | E05B 29/004 70/377 |
| 7,007,528 B2 | | 3/2006 | Chong et al. | |
| 7,047,778 B2 | | 5/2006 | Dimig | |
| 7,114,357 B2 | | 10/2006 | Armstrong et al. | |
| 7,140,213 B2 | | 11/2006 | Feucht et al. | |
| 7,213,429 B2 | | 5/2007 | Armstrong et al. | |
| 7,434,431 B2 | | 10/2008 | Armstrong et al. | |
| 7,565,825 B2 | | 7/2009 | Wheatland et al. | |
| 7,624,606 B1 | | 12/2009 | Huang | |
| 7,628,048 B2 | | 12/2009 | Huang | |
| 7,634,930 B2 | | 12/2009 | Boesel et al. | |
| 7,836,739 B2 | | 11/2010 | Huang | |
| 7,874,191 B2 | * | 1/2011 | Chiang | E05B 29/004 70/383 |

(Continued)

*Primary Examiner* — Christopher J Boswell
(74) *Attorney, Agent, or Firm* — Volpe and Koenig, P.C.

(57) ABSTRACT

A self-learning lock cylinder assembly or lock tumbler and tools capable of teaching the self-learning key configuration of a pre-existing key is disclosed. The assembly does not require disassembly and re-assembly of internal components by a skilled user. The individual performing the self-learning procedure sets the assembly by a simple rotation motion. The individual performing the self-learning procedure can verify that the original key and copies of the original key function properly within the lock cylinder prior to final assembly.

19 Claims, 11 Drawing Sheets

(56) References Cited

U.S. PATENT DOCUMENTS

| | | |
|---|---|---|
| 7,937,976 B2 | 5/2011 | Huang |
| 7,975,518 B2 * | 7/2011 | Chiang ................. E05B 29/004 |
| | | 70/383 |
| 7,980,104 B1 | 7/2011 | Huang |
| 7,980,106 B2 | 7/2011 | Huang |
| 8,056,378 B2 | 11/2011 | Huang |
| 8,074,480 B2 | 12/2011 | Huang |
| 8,161,783 B2 | 4/2012 | Huang et al. |
| 8,347,678 B2 | 1/2013 | Chong |
| 8,448,484 B2 | 5/2013 | Huang |
| 8,739,587 B2 | 6/2014 | Chen |
| 8,881,567 B2 | 11/2014 | Chong |
| 8,893,536 B2 | 11/2014 | Huang |
| 9,758,987 B2 | 9/2017 | McCann et al. |
| 2003/0089149 A1 * | 5/2003 | Suzuki ................. E05B 29/004 |
| | | 70/492 |
| 2004/0163433 A1 | 8/2004 | Armstrong et al. |
| 2005/0016234 A1 | 1/2005 | Strader et al. |
| 2006/0059965 A1 | 3/2006 | Benstead |
| 2006/0101880 A1 * | 5/2006 | Ward-Dolkas ........ E05B 29/004 |
| | | 70/492 |
| 2009/0277239 A1 | 11/2009 | Mathachan |
| 2011/0041577 A1 | 2/2011 | Zhang |
| 2012/0247163 A1 | 10/2012 | Damikolas |
| 2013/0086958 A1 | 4/2013 | Emory |

* cited by examiner

SELF-LEARNING LOCK AND LOCK ASSEMBLY

FIELD OF INVENTION

The present invention relates to lock assemblies that can be programmed to accept an existing key. Locks of this type are generally referred to as adaptable to being rekeyed.

BACKGROUND

Current lock cylinders and mating keys often wear from repeated use or may be otherwise damaged and need to be replaced. This problem is especially evident in the area of automotive ignitions. A problem arises with replacement of the lock cylinder in an automotive ignition or other similar application when the original key includes other functions such as opening doors, the trunk lid or windows. Furthermore, replacing an automotive ignition key typically requires a specific housing that mates to a specific location. Additionally, the original key maybe digitally coded to other automobile applications or anti-theft systems.

Current lock cylinders that can be rekeyed generally involve disassembly and re-assembly of internal components by a skilled user or are one-time only assemblies with no means to verify additional copies of the original key are functional after a rekeying procedure. Current self-learning locks typically involve the use of a fixture or tool to set the lock elements and those fixtures or tools are difficult to use.

There exists a need for a simplified self-learning lock assembly that reuses the original key when replacing a defective lock cylinder and has a simplified, easier to use learning assembly.

SUMMARY

The present invention provides of a lock cylinder assembly or lock tumbler and an assembly tool for setting a self-learning cylinder or tumbler configuration with a pre-existing key. The individual performing the self-learning does not need special locksmith tools or experience because a simple rotation motion accomplishes the setting. The self-learning lock assembly includes a lock tumbler body having a central axis (CA) and a tubular body portion that extends along the central axis (CA) and has interior cavity. A plurality of wafer receiving slots intersect the interior cavity in tubular body portion. A plurality of wafers are positioned in the wafer receiving slots to form an array of wafers with a portion of each wafer extending into the interior cavity and a portion of each wafer extending out of the tumbler body. Each wafer has paired external and internal learning segments. The internal learning segment is nested in the external segment, and the segments have complementary projections and recesses that enable movement with respect to each other to define a key receiving passage. The internal segments define a key receiving slot. The learning housing has a non-circular cavity that receives the lock tumbler body and wafer array and, through rotation of the housing, causes movement of the individual wafers according to a key located in the key receiving passage. The individual performing the self-learning procedure also can verify that the original key functions properly prior to final assembly and installation of the lock with a test housing.

BRIEF DESCRIPTION OF THE DRAWING(S)

Section 9 is a sectional view along the line 9-9 prior to key insertion and learning.

DETAILED DESCRIPTION OF THE PREFERRED EMBODIMENTS

Figures 1, 2:
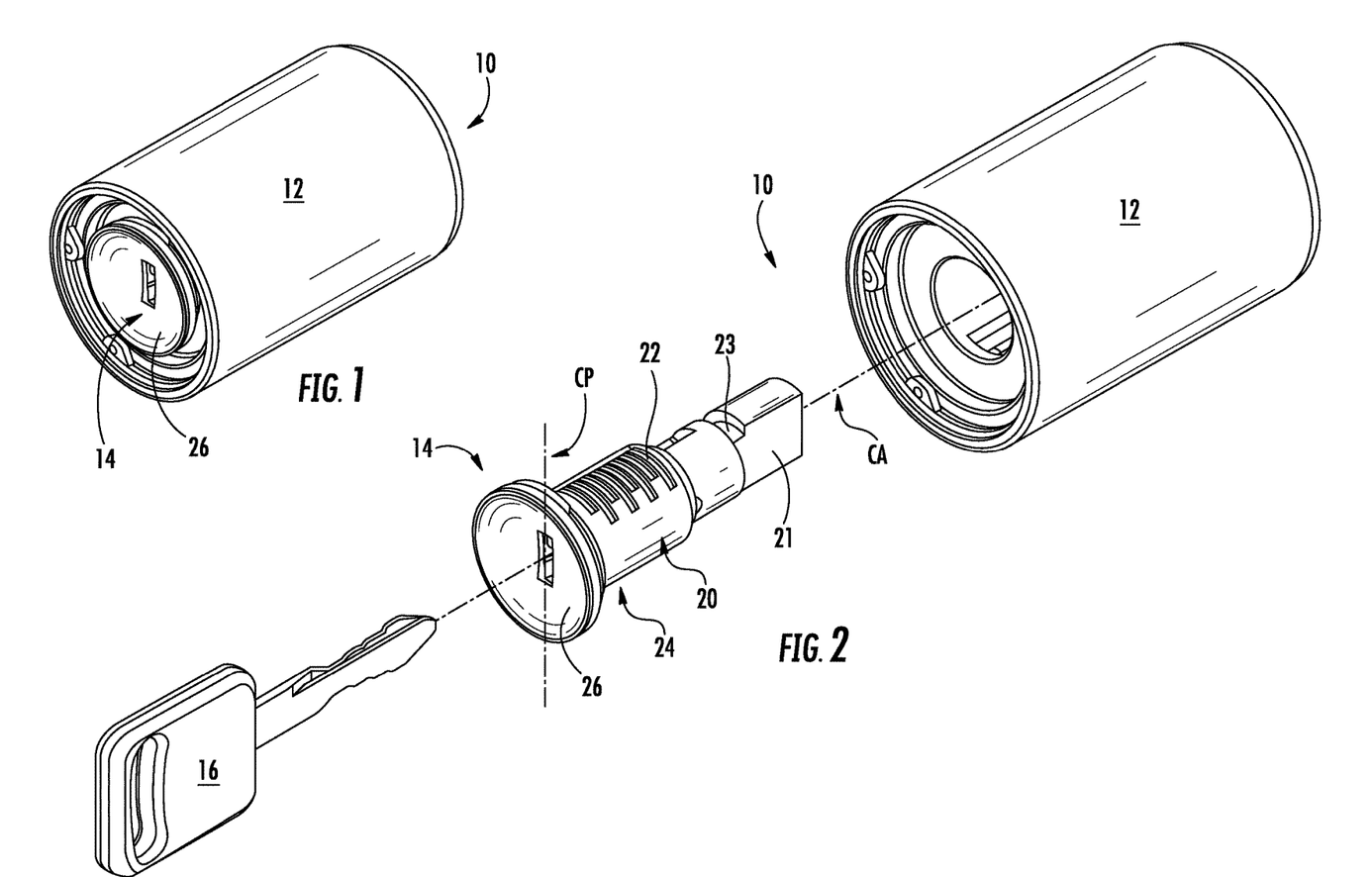
FIG. 1 illustrates a self-learning plug or tumbler in the default position in the coding tool prior to the learning procedure.
FIG. 2 is an exploded view of the parts assembled in FIG. 1 and illustrates an exemplary key.

With reference to FIG. 1, there is illustrated self-learning assembly 10 that includes a tumbler or plug 14 and a coding or learning tool 12. FIG. 2 is an exploded view of the assembly 10 showing the coding or learning tool 12, the plug or tumbler 14 and an existing key 16. The assembly 10 has a lengthwise central axis CA and a central plane CP that is generally perpendicular to the lengthwise central axis CA. The plug or tumbler 14 has a generally tubular wafer receiving portion 20 with a plurality of learning wafer receiving slots 22 and 24. The wafer receiving slots 22 and 24 on opposite surfaces of the tumbler 14 are generally perpendicular to the central plane CP so that an array of inserted wafers are interleafed or alternated from one surface to the other along the central axis CA. At the end of the tumbler 14 opposite the outer cap portion 26, there is a flat or planar wall 21, which will be explained in more detail with reference to FIGS. 12 and 13.

Figure 3:
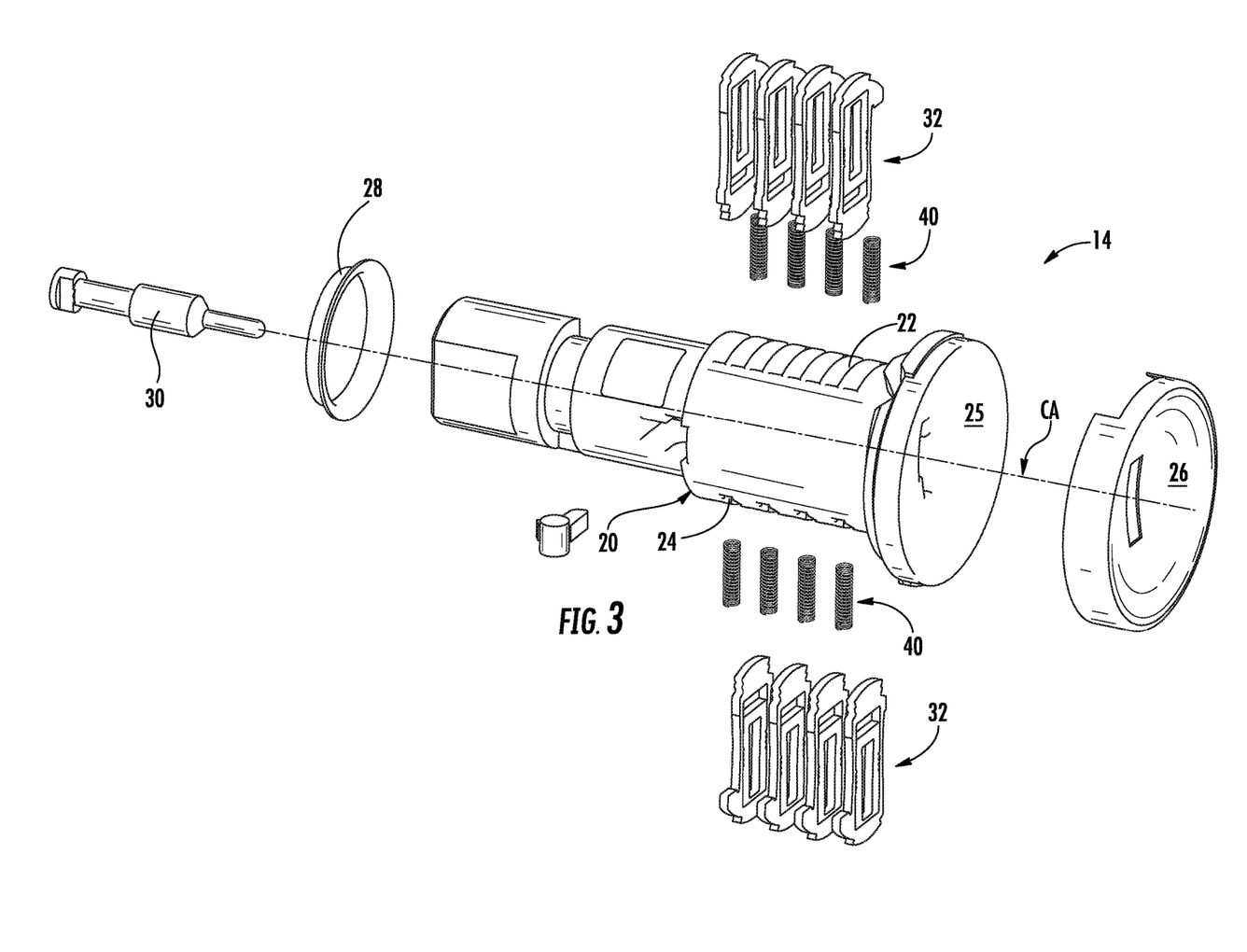
FIG. 3 is an exploded view of the plug in FIG. 2.

With reference to the exploded view in FIG. 3, the plug 14, in addition to the plurality of wafer receiving slots 22 and 24, and outer cap portion 26, has an inner cap portion 25, a ring 28 and a plunger rod 30. The ring 28 and plunger 30 act together with spring 58, see FIG. 4, to form an ejection element that assists in removing the tumbler 14 from the learning tool 12. Each learning wafer 32 is associated with a biasing element 40, a compression spring in this embodiment, that urges the wafers to extend beyond the outer surface of the tubular wafer receiving portion 20. The wafers 32 are explained in more detail with reference to FIGS. 8 through 8B.

Figures 4, 5:
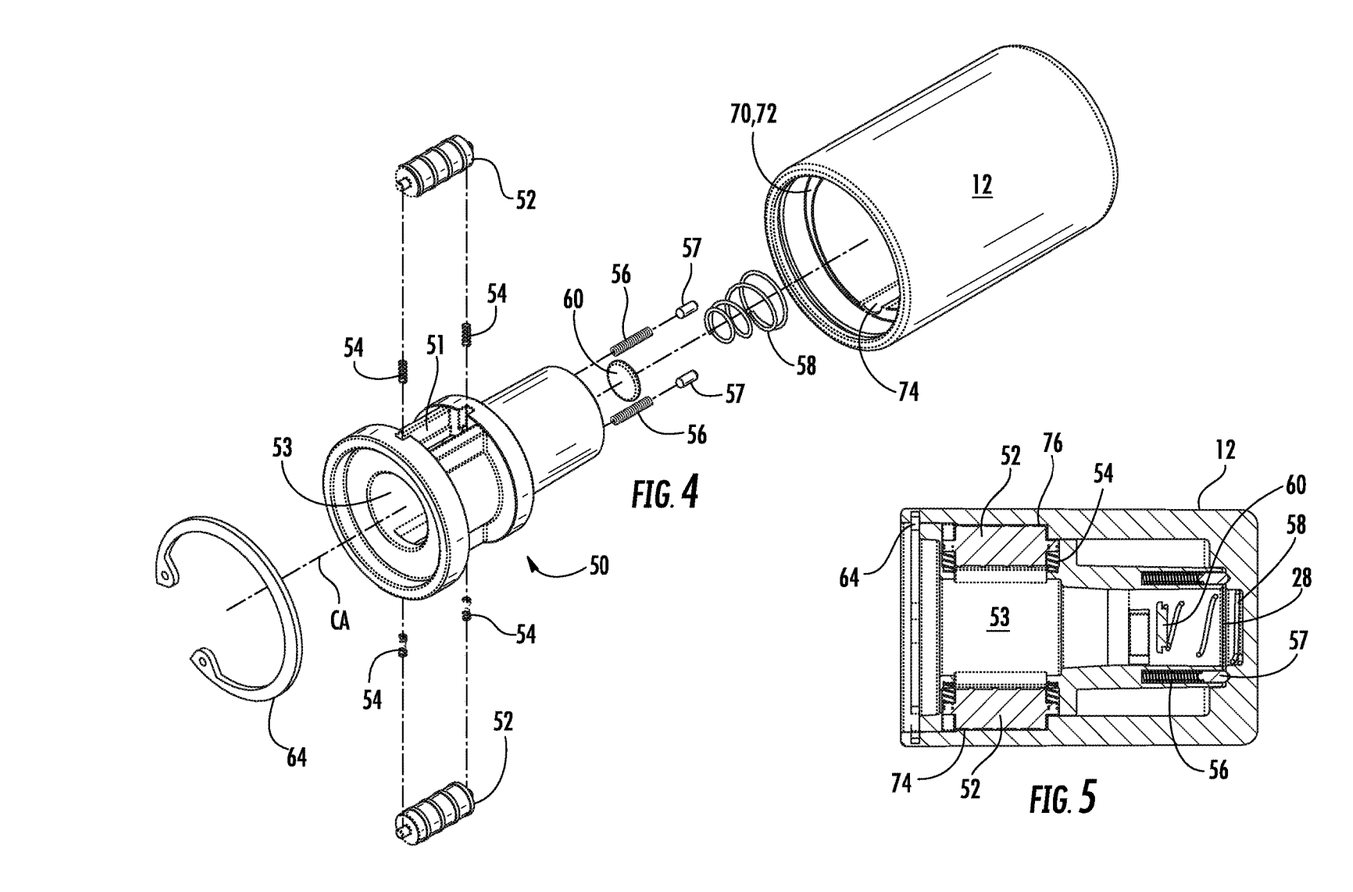
FIG. 4 is an exploded view of the housing or coding tool for programming the plug in FIGS. 2 and 3.
FIG. 5 is a sectional view of an assembled coding tool of FIG. 4.
Figures 6A, 6B, 6C:
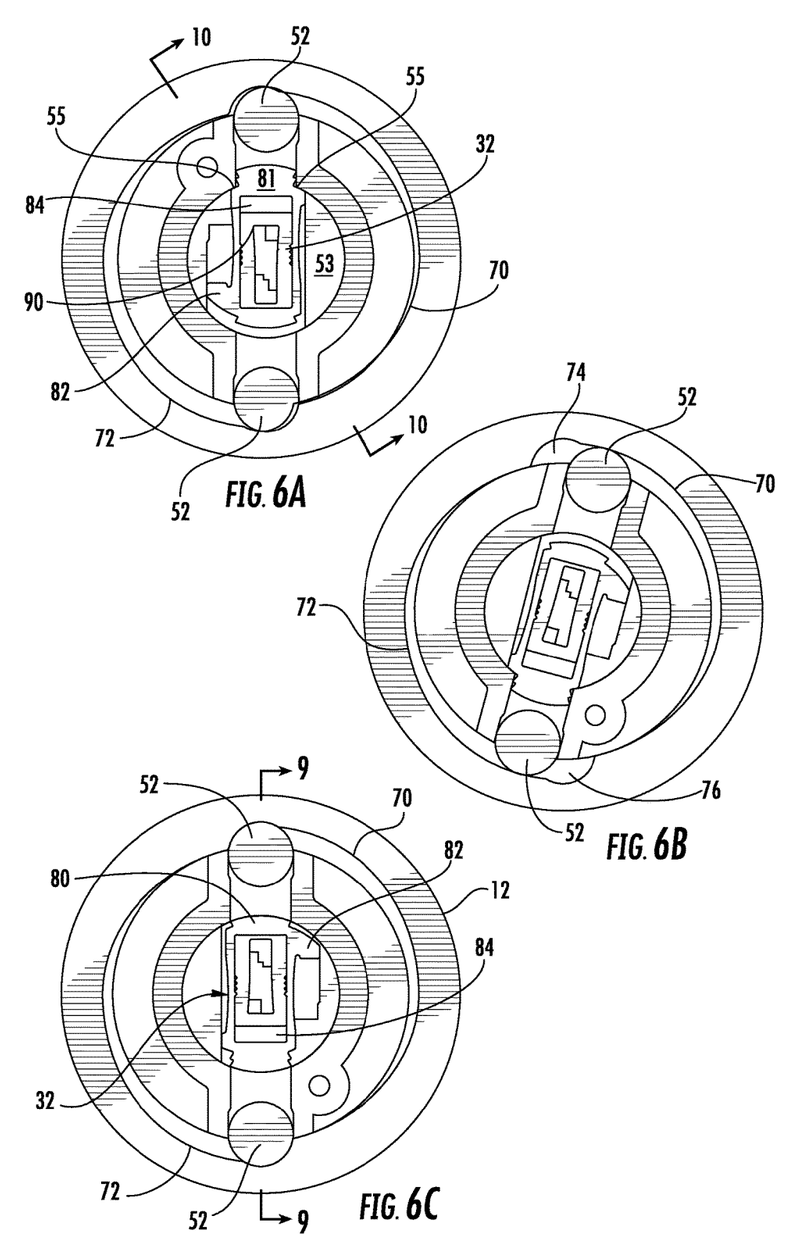
FIG. 6A illustrates the starting position of the plug in the coding tool.
FIG. 6B illustrates the contact between the plug and the cam surface of the self-learning coding tool.
FIG. 6C illustrates the end position of the plug in the coding tool.

With reference to FIG. 4, there is an exploded view of presently preferred components that constitute the interior workings of the assembled housing or coding tool 12. The tumbler receiving drum 50 has slots 51 that extend parallel to the central axis CA and open into the interior 53 of the drum 50. The slots 51 are dimensioned to receive rollers 52 that are outwardly biased from drum 50 by the springs 54 and extend above the surface of the drum 50. At one end of drum 50 there are two springs 56 and two pins 57 that are received in a respective bore in the drum 50 and a central spring 58 and pad 60 that are receive in the remote end of the drum 50, FIG. 5 illustrates the assembled interior components of tool 12.

Figure 8:
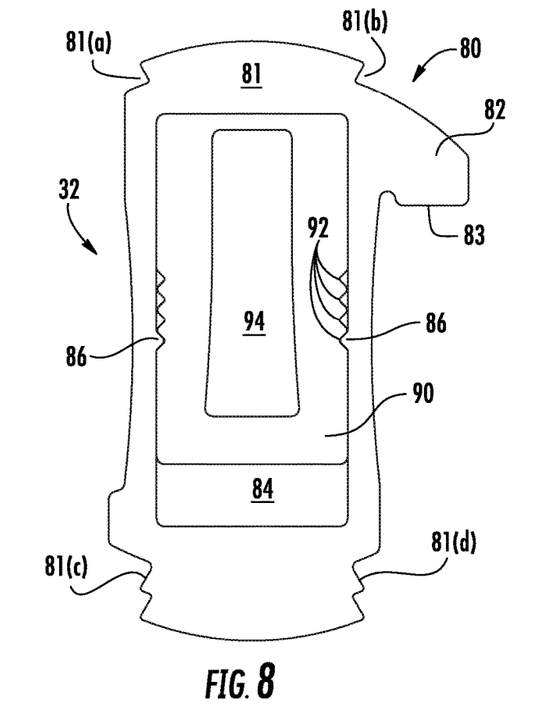
FIG. 8 is an assembled view of a coding wafer according to the invention.
Figure 8A:
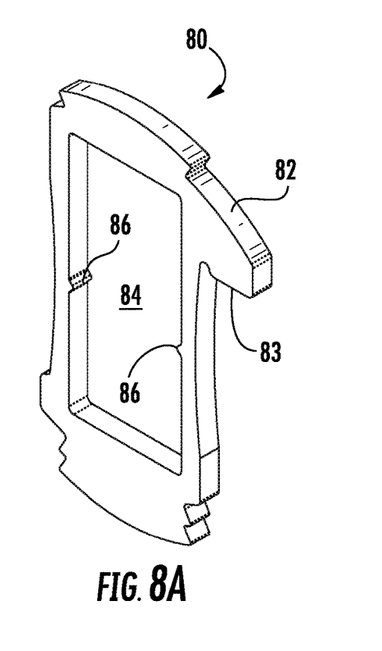
FIG. 8A is a perspective view of the outer frame of the wafer shown in FIG. 8.
Figure 8B:
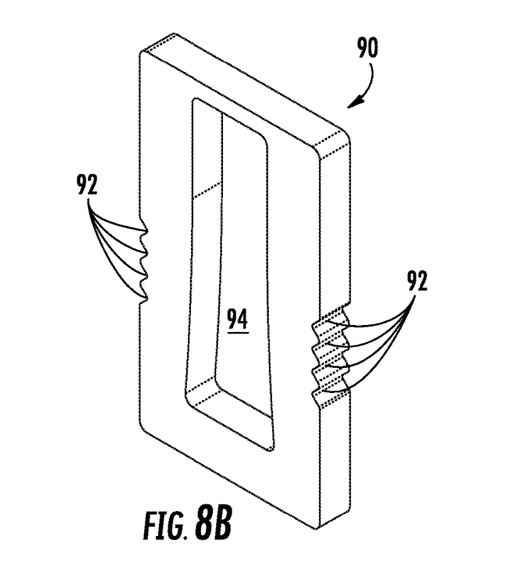
FIG. 8B is a perspective inner frame of the wafer shown in FIG. 8.

Referring now to FIGS. 4 through 6B, the interior of coding tool 12 has arcuate surfaces or cams 70 and 72 disposed on either side of and in communication with notches 74 and 76 that are generally in the central plane CP. The notches 74 and 76 are positioned at the widest portions of the arcuate surfaces or cams 70 and 72 and dimensioned to receive that portion of a respective roller 52 that extends above the drum 50. As can be seen by comparing FIG. 6A to FIG. 6C, rotation of the drum 50 against the arcuate surfaces or cams 70 and 72 caused the rollers 52 to move into the interior 53 and into contact with the wafers 32. Rotation of the drum 50 for 180 degrees in coding tool 12 results in positioning of the wafer 32 according to the topography of the key used for the rotation. As shown in FIGS. 8 to 8B, the nested configuration of the wafers 32 allows them to respond to the rotation.

Referring to FIGS. 6A through 8B, the upper portion 81 of the exterior segment 80 of each wafer 32 has notches 81(a) and 81(b) that abut a respective shoulder 55 when the plug is in the initial or pre-keyed configurations.

Figure 7:
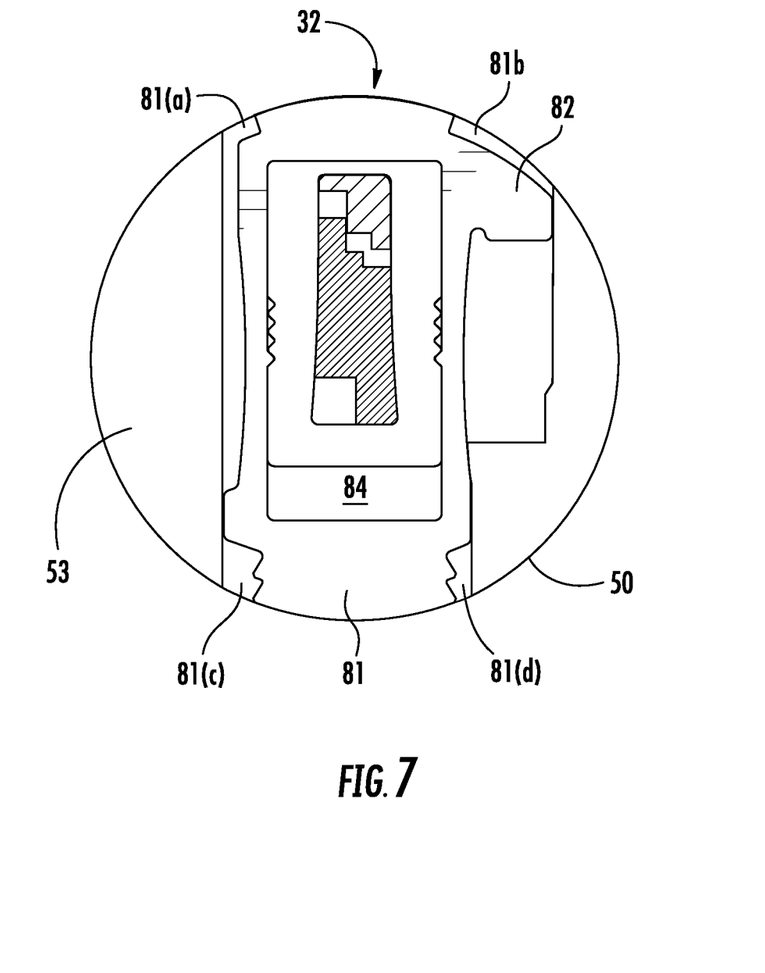
FIG. 7 is an enlarged view of the plug and learning wafers after a successful coding that has all of the wafers located with the circumference of the plug.

With reference to FIG. 7, there is illustrated a successful coding of the wafers 32 to a key. In a successful coding, the wafers 32 are set within the circumference of the wafer receiving portion 20 of tumbler 14. Because the wafers 32 are within that circumference, the wafers notches 81 (a)-(d), discussed below, are no longer in contact with any structure that will prevent rotation of the tumbler in the counterclockwise direction with respect to the drum 50, which was rotated in a clockwise direction during the coding operation.

With reference to FIGS. 8 to 8B, the preferred wafers 32 are assembled from nested interior and exterior segments that have complementary projections and recesses that permit movement relative to each other. In this presently preferred configuration, the wafers 32 have a frame like outer or exterior segment 80 with an interior void or window 84 and inward projections 86, see FIG. 8A. Still with reference FIG. 8A, the outer projection 82 of each exterior segment 80 has an abutment surface 83 that abuts a respective spring 40, see FIG. 3. The exterior segment 80 has a plurality of notches 81 (a)-(d). In this configuration only the notches 81(a) and 81(b) of upper portion 81 of each exterior segment 80 are in abutment with the interior shoulders 55 prior to coding, see FIG. 6A. The window 84 of outer or exterior member 80 is sized so that the inner or internal segment 90 has sufficient space for vertical movement within the window 84 of the exterior segment 80 and the notches or detents 92 contact the projections 86. The notches 92 and projections 86 are dimensioned to slip pass one another when the rollers 52 place pressure on the wafers during rotation within the tool 12. The inner or interior segments 90 of the plurality of wafers 32 define a key receiving through alignment of inner windows 94 with the central axis CA and central plane CP. This is illustrated in the section of FIG. 7.

The two part nested configuration of the wafer 32 is particularly useful if there is a keying error. To correct an error, the interior segment 90 can removed from the exterior segment 90 and relocated in the initial or neutral position.

Figure 9:
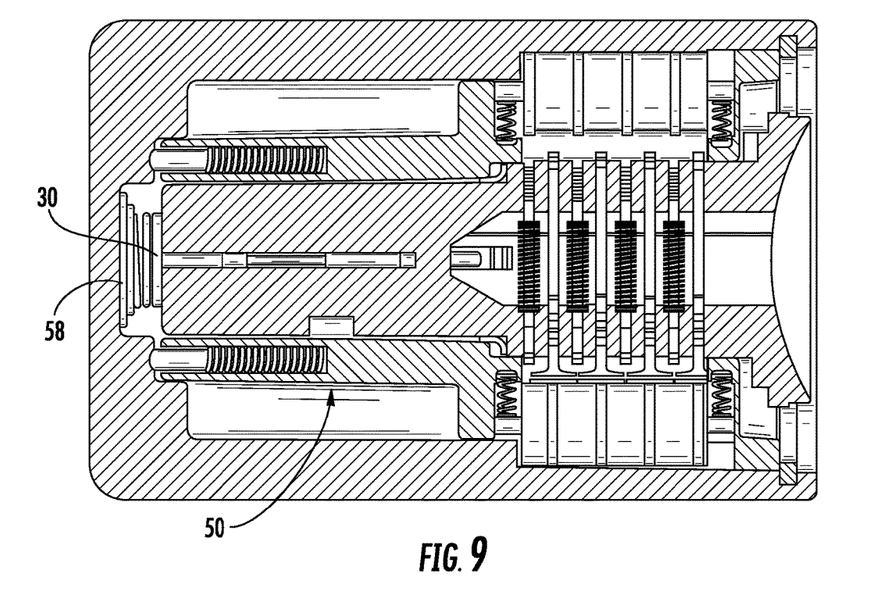
Figure 10:
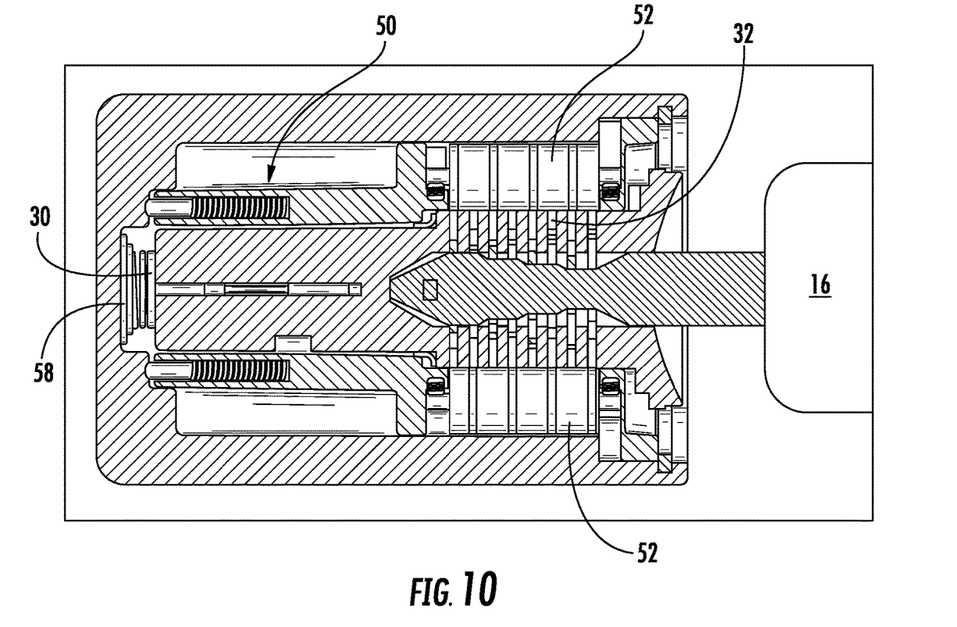
FIG. 10 is a sectional view along the line 10-10 after rotation with the plug wafers in the learned position.

For the keying operation, the interior segment 90 includes the key window 94 and rotation of a key inserted in the aligned windows 94 causes the drum 50 to follow the cam surfaces 70 and 72, the rollers 52 contact the outer or exterior segments 80 of each wafer 32 and move them relative to interior segments 90 and the interior segments 90 move relative to the exterior segments 80 based on contact with the key so the interior segment alignment is complementary to the topography of the inserted key. In other words, an original key 16 with a preexisting topography determines the configuration of the array of wafers 32 as shown in FIGS. 9 and 10.

It will be appreciated that the dimensions of the learning tool are selected to complement the associated tumbler or plug 14, which in kind is dimensioned to fit within the original housing associated with the key used in the learning process.

After completing the rotation of the tumbler in the self-learning procedure, the key 16 and plug 14 can be tested for operation in the self-learning housing. With the original key still in place, the key and plug assembly should freely rotate from a first position, such as FIG. 6C, to a second position that is counterclockwise to the prior rotation. A free rotation will confirm that all wafers 32 are properly set as illustrated in FIG. 7.

Figure 15:
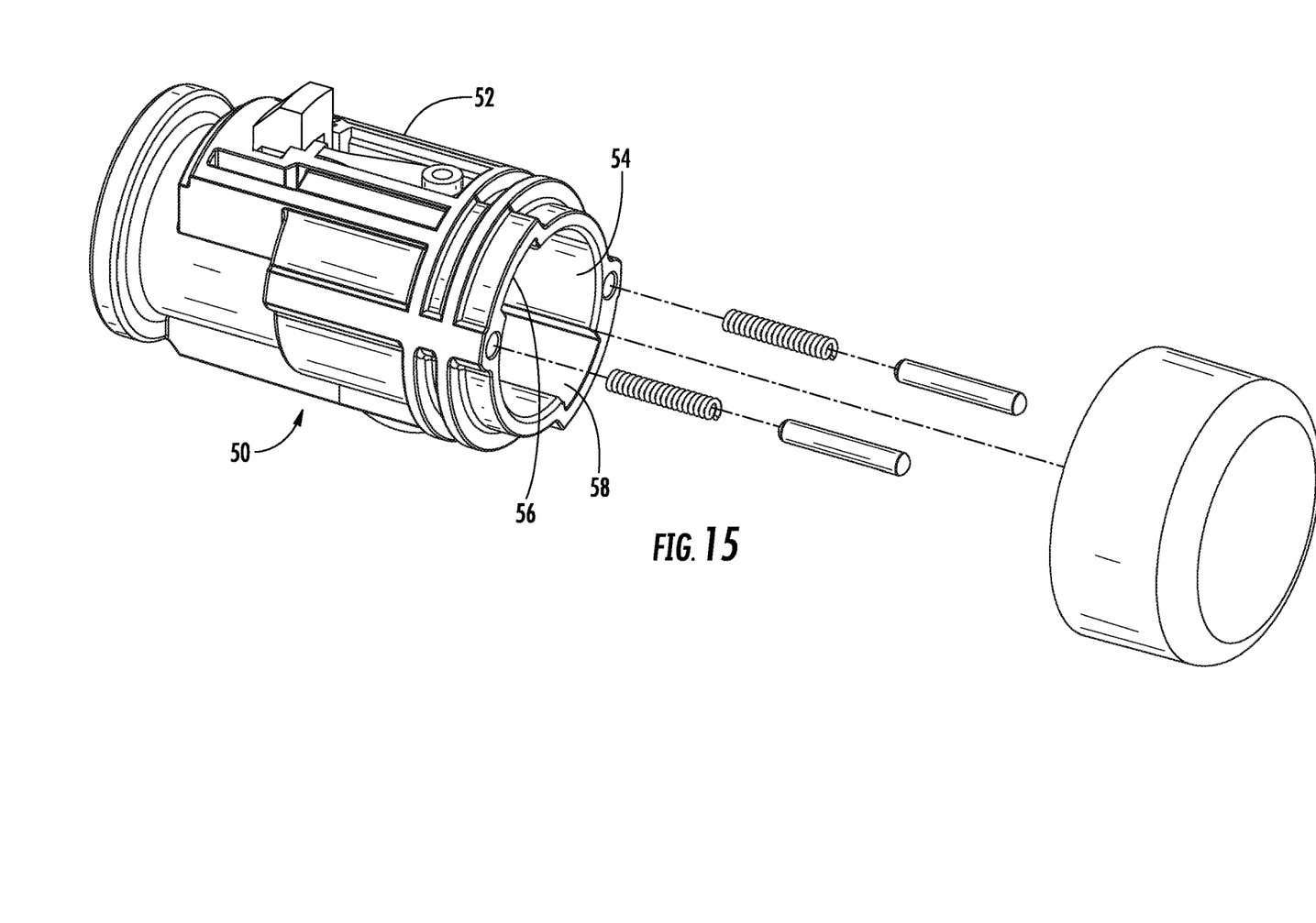

When the self-learning procedure is complete and verified, the key and plug sub-assembly can be freely rotated and removed from the drum and transferred to a housing 40, see FIG. 15, which has the external geometric features 42 to mate with an intended application, and become a finished assembly.

Figure 11:
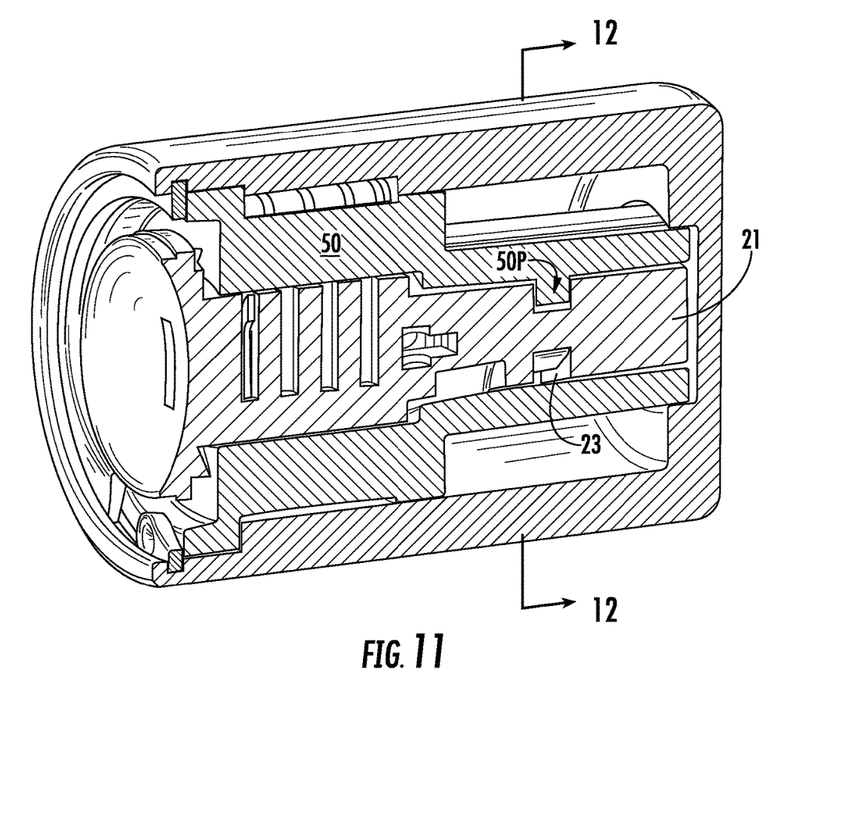
FIG. 11 is an illustrative section of the code plug in the learning tool prior to a code completion check.
Figure 12:
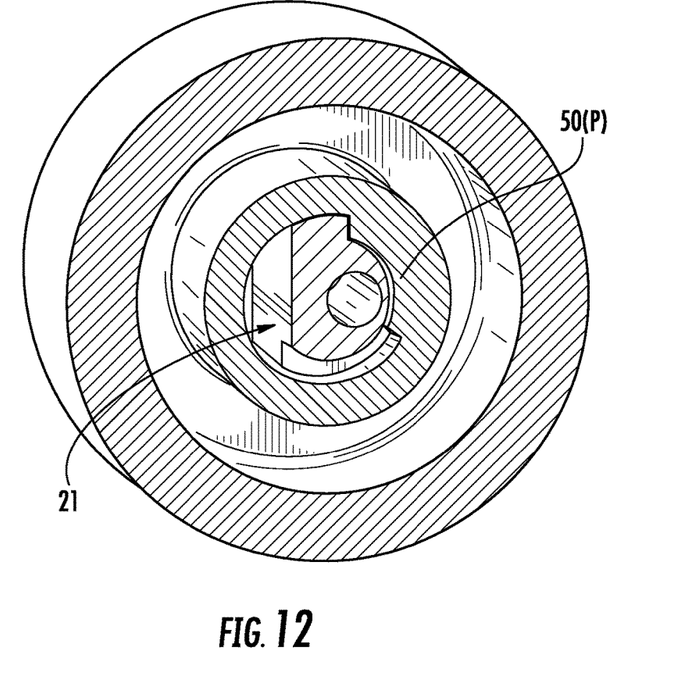
FIG. 12 is an illustrative section along the line 12-12
Figure 13:
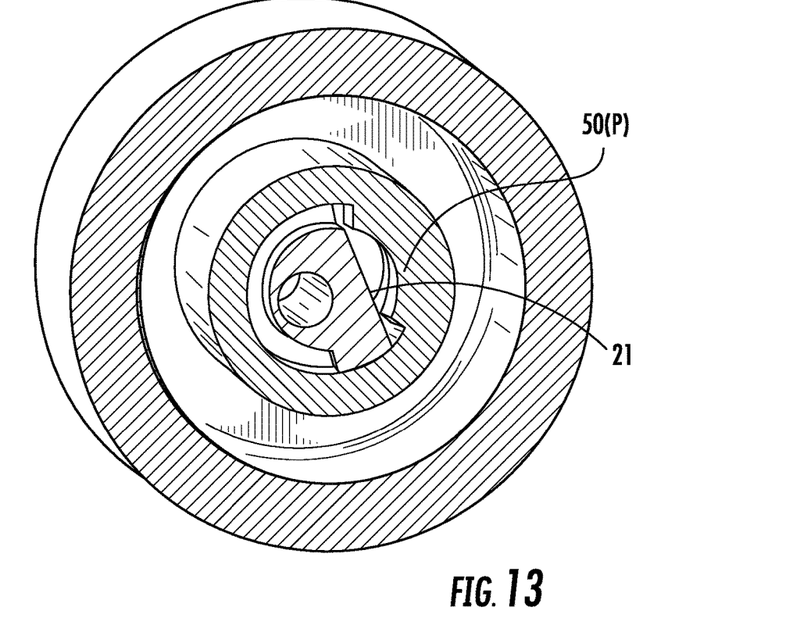
FIG. 13 is an illustrative section that shows the section in FIG. 12 rotated counterclockwise from FIG. 12.
Figure 14:
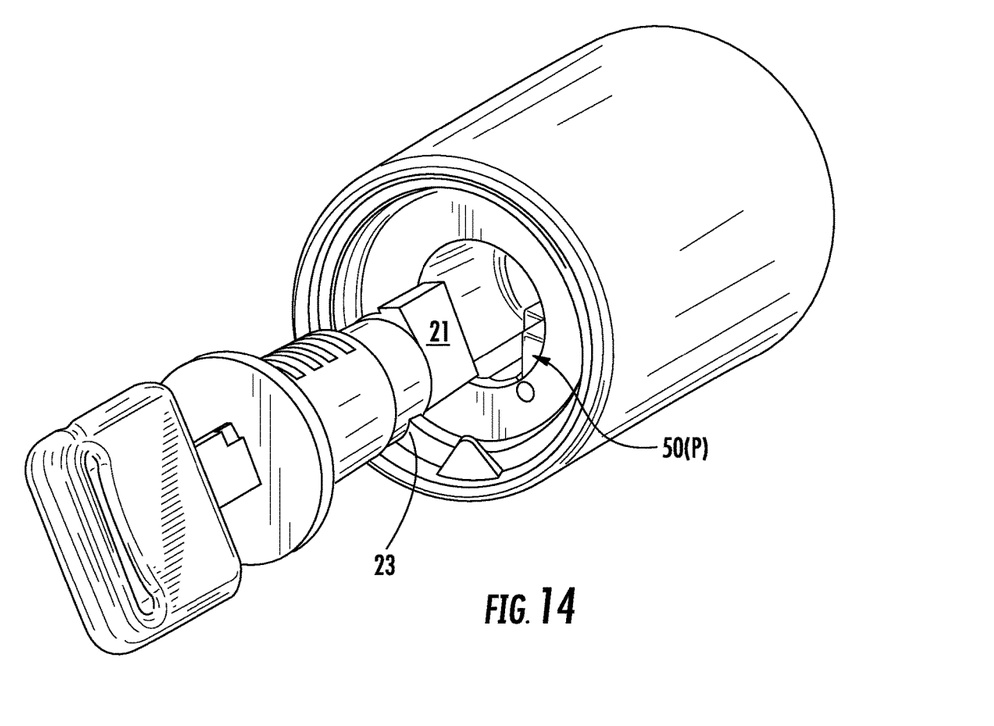
FIG. 14 illustrates the completed plug as it is removed from the coding tool; and, FIG. 15 is a partially exploded view of an exemplary housing subassembly for use with the coded plug and has an exterior configuration according to the intended application.

With reference to FIGS. 11 through 13, the check feature of the invention will be explained in more detail. With reference to FIG. 11, there is illustrated the initial position of the tumbler 14 in the drum 50 where the projection of 50(P) is within the grove 23. In this position, the tumbler 14 cannot be removed from the drum 50. After rotation to set the wafers 32, the flat or planar wall 21 is rotated 180 degrees in the drum 50. Rotation of tumbler in a counterclockwise direction relative to FIG. 12 positions the flat or planar wall 21 opposite the projection 50(P) and frees groove 23 from projection 50(P). The tumbler 14 can them be removed as illustrated in FIG. 14 and inserted into the appropriate housing 40 as indicated in FIG. 15. At this point, it must be remembered that the tumbler 14 cannot make the necessary rotation if the wafers 32 have not been properly set as illustrated in FIG. 7. The exterior of the housing 50 illustrated in FIG. 15 is determined by the specific application while the interior 54 is configured to complement the coded tumbler 14. When the tumbler 14 is positioned in the interior 54 and the key is removed, the exterior wafer members 80 are free to expand into the respective recess 56 or 58. Reinsertion of the proper coded key will realign the wafers 32 and the tumbler can be turned in the usual manner.

We claim:

1. A self-learning lock assembly comprising:
a lock tumbler body having a length that extends along a central axis (CA) and includes a tubular body cavity that extends inwardly along the central axis (CA) and a plurality of wafer receiving slots that are in an outer surface of the tumbler and intersect the tubular body cavity;

a plurality of wafers that are located in the wafer receiving slots, a portion of each of the plurality of wafers extends into the tubular body cavity and a portion of each of the plurality of wafers extends out of the lock tumbler body;

each wafer of the plurality of wafers has paired external and internal learning segments, the external learning segment defines an enclosed central opening that completely surrounds the internal learning segment, the paired external learning and internal learning segments have complementary projections and recesses that enables the paired external learning and internal learning segments to move with respect to each other and the internal learning segments of the plurality of wafers align to define a key receiving passage; and, a housing with a non-circular receiving cavity that has a first predetermined dimension that receives the lock tumbler body and plurality of wafers and second predetermined dimension that is less than the first predetermined;

whereby rotation of the housing and the lock tumbler body with respect to each other from the first predetermined dimension to the second predetermined of the housing causes movement of the plurality of wafers into the lock tumbler body and positions the learning segments of each wafer according to a key located in the key receiving passage defined by the plurality of internal learning segments.

2. A self-learning lock kit comprising:

a lock tumbler body having a length that extends along a central axis (CA) and a tubular portion that defines a cavity extending along the central axis (CA) and a plurality of wafer receiving slots in the generally tubular portion that extend through to the cavity;

a plurality of wafers that are located in the wafer receiving slots, a portion of each of the plurality of wafers extends into the cavity and a portion of each of the plurality of wafers extends outside of the tubular portion;

each wafer of the plurality of wafers has paired external and internal learning segments, the external learning segment defines an enclosed opening that completely surrounds the internal learning segment, the paired external learning and internal learning segments have complementary projections and recesses that enables the paired external learning and internal learning segments to move with respect to each other and the internal learning segments of the plurality of wafers align to define a key receiving passage;

a housing with a non-circular receiving cavity that has a first dimension at least equal to a combination of the tubular portion and the portion of each of the plurality of wafers extending outside of the tubular portion and second lesser dimension that is substantially equal to just the tubular portion;

whereby rotation of the housing and the lock tumbler body and plurality of wafers with respect to each other from the first dimension to the second dimension causes movement of the learning segments associated and positions the learning segments of each wafer according to a key located in the key receiving passage defined by the plurality of internal learning segments.

3. A self-learning lock tumbler and a tumbler coding device comprising:

an elongated lock tumbler body having:

an elongated slot dimensioned to receive an existing lock key and a plurality of slots that intersect the elongated slot;

a plurality of wafers that intersect the slot, each of the plurality of wafers is received within a slot among the plurality of slots that intersect the elongated slot and includes an external learning segment that has an enclosed central opening and an internal movable learning segment that complements the enclosed central opening and has a central passage aligned with the elongated slot, the enclosed central opening of the external learning segment surrounds the internal movable learning segment; and, a tumbler coding device having:

a housing with a non-circular receiving cavity that has a predetermined minimum dimension that encloses the plurality of wafers;

whereby the movable learning segment associated with each wafer is positioned according to an existing key through rotation of the tumbler within the non-circular receiving cavity.

4. A self-learning lock comprising:

a tumbler body having a predetermined maximum diameter, a key receiving cavity and a plurality of wafer receiving slots that intersect the key receiving cavity:

a plurality of learning wafers, each wafer is comprised of mated outer and inner members that are mobile with respect to each other and is positioned within a respective wafer receiving slot that intersects the key receiving cavity, the outer members each define an interior opening that completely surrounds a respective one of the inner members, and each one of the enclosed central openings is complementary to a respective one of the inner members; and, a learning tool with an acentric tumbler body receiving cavity that has a decreasing diameter;

whereby a key inserted in the key receiving cavity of the tumbler body enables rotation of the tumbler body with respect to the acentric tumbler body receiving cavity and the mated outer and inner members of the learning wafers are repositioned according to a topographical pattern associated with an inserted key.

5. A self-learning lock comprising:

a tumbler body having a key receiving cavity and a plurality of learning wafer receiving slots that intersect the key receiving cavity:

a plurality of learning wafers, each learning wafer positioned within a respective wafer receiving slot that intersects the key receiving cavity;

each of the plurality of learning wafers is comprised of mated outer and inner members that are mobile with respect to each other, the outer members each have an opening that the outer member completely surrounds a respective one of the inner members, and each one of the openings is geometrically complementary to a respective one of the inner members; and, a learning tool with an acentric tumbler body receiving cavity;

whereby a key inserted in the key receiving cavity of the tumbler body enables rotation of the tumbler body with respect to the acentric tumbler body receiving cavity and the mated outer and inner members of the learning wafers are repositioned according to a topographical pattern associated with an inserted key.

6. A self-learning lock comprising:
a tumbler body having a key receiving cavity and a plurality of wafer receiving slots that intersect the key receiving cavity:
a plurality of wafers, each wafer being positioned within a respective wafer receiving slot that intersects the key receiving cavity and comprised of mated outer and inner members that are mobile with respect to each other, the outer members each include a central portion that completely surrounds a respective one of the inner members, and each central portion is complementary to a respective one of the inner members; and,
a tumbler coding tool having an acentric tumbler body receiving cavity;
whereby rotation of the tumbler body with respect to the acentric tumbler body receiving cavity with a key inserted in the key receiving cavity of the tumbler body repositions the mated outer and inner members of the learning wafers according to a topographical pattern associated with an inserted key.

7. A kit for programming a self-learning lock tumbler to the topography of an existing key, the kit comprising:
a tumbler assembly comprising:
a body portion that includes a key receiving slot and a plurality of wafer receiving slots;
a plurality of wafers, each is positioned in a respective wafer receiving slot and including a generally rectangular frame and a movable wafer insert that is located in a neutral position within the rectangular frame and is completely surrounded by the rectangular frame; and,
a coding tool comprising:
a housing with an interior cavity that receives the tumbler with the plurality of wafers and wafer inserts in a neutral position and a cam surface that gradually reduces the cavity from a neutral position to a programming position and reprograms the plurality of wafers according to an existing key topography when tumbler against the cam surface.

8. A self-learning lock tumbler comprising:
a tumbler body;
a slot in the tumbler body that receives an existing lock key having a predetermined topography;
a plurality of wafer receiving slots in the tumbler body that are generally arranged perpendicular to the slot; and,
a plurality of generally rectangular wafers that are received within a respective wafer receiving slot and define a central passage aligned with the slot in the tumbler body, each of the plurality of wafers has nested parts that are movable with respect to each other and each of the nested parts has one of a project or mating detent, a first one of each of the nested parts is completely surrounded by second one of each of the nested parts, and the a first one of each of the nested parts and the second one of each of the nested parts geometrically complementary to each other.

9. The tumbler of claim 8, wherein the plurality of wafer receiving slots in the tumbler body are arranged on the tumbler body in opposition to each other.

10. The tumbler body of claim 9, wherein the plurality of wafer receiving slots in the tumbler body that are arranged on the tumbler body in opposition to each other alternate with each other.

11. The tumbler of claim 8, wherein the plurality of wafers are biased out of the tumbler body.

12. The tumbler of claim 11, wherein the plurality of wafers are biased out of the tumbler body by a plurality of compression springs.

13. The tumbler of claim 11, wherein the plurality of wafers are biased out of the tumbler body by an equal plurality of compression springs.

14. A wafer array for a self-learning lock tumbler, the wafer array comprising:
a plurality of wafers that have paired external and internal learning segments, the external learning segments each define an enclosed central opening that completely surrounds a respective one of the internal learning segments, the enclosed central openings are each complementary to a respective one of the internal learning segments, the paired external learning and internal learning segments have complementary projections and recesses that enables the paired external learning and internal learning segments to move with respect to each other and the internal learning segments of the plurality of wafers align to define a key receiving passage.

15. A wafer array for a self-learning lock tumbler, the wafer array comprising:
a plurality of wafers that have nested external and internal segments with complementary projections and recesses that enable the nested segments to move with respect to each other and the plurality of internal segments align to define a key receiving passage, enclosed central openings defined by the external segments each surround an entire periphery of a respective one of the internal segments, and the enclosed central openings are each complementary to a respective one of the internal segments.

16. A plug assembly that is configurable to the topography of an existing key, the plug assembly comprising:
a body portion that includes a key receiving slot and a plurality of wafer receiving slots;
a plurality of wafers, each positioned in a respective wafer receiving slot and including a generally rectangular frame and a movable insert that is located in a neutral position within the rectangular frame, the movable insert being completely surrounded by an enclosed central opening defined by an exterior segment of the plurality of wafers, the enclosed central opening is complementary to the movable insert;
wherein the plurality of movable inserts define a key passage that is aligned with the key receiving slot and each of the inserts is repositionable within a respective generally rectangular frame to conform to an existing key's topography.

17. The plug of claim 16, wherein the plurality of wafer receiving slots are arranged in opposition to each other.

18. The plug of claim 17, wherein the plurality of wafer receiving slots arranged in opposition to each other alternate with each other.

19. The plug of claim 18, wherein the plurality of wafers are biased out of the plug.

* * * * *

UNITED STATES PATENT AND TRADEMARK OFFICE
CERTIFICATE OF CORRECTION

PATENT NO. : 10,465,419 B2
APPLICATION NO. : 15/720744
DATED : November 5, 2019
INVENTOR(S) : John W. Iden and James J. Rivera It is certified that error appears in the above-identified patent and that said Letters Patent is hereby corrected as shown below:

In the Drawings

In FIG. 7, Sheet 5 of 11, delete "81b" and insert -- 81(b) --, therefor.

In the Specification

In Column 2, Line 24, delete "Section 9" and insert -- FIG. 9 --, therefor.

In Column 2, Line 30, delete "12-12" and insert -- 12-12; --, therefor.

In Column 3, Line 14, delete "are receive" and insert -- are received --, therefor.

In Column 4, Lines 6-7, delete "exterior segment 90" and insert -- exterior segment 80 --, therefor.

In the Claims

In Column 6, Line 28, in Claim 4, delete "cavity:" and insert -- cavity; --, therefor.

In Column 6, Line 49, in Claim 5, delete "cavity:" and insert -- cavity; --, therefor.

In Column 7, Line 4, in Claim 6, delete "cavity:" and insert -- cavity; --, therefor.

In Column 7, Line 55, in Claim 8, delete "the a" and insert -- the --, therefor.

Signed and Sealed this
Twenty-fifth Day of February, 2020

Andrei Iancu
*Director of the United States Patent and Trademark Office*